(12) United States Patent
Shavit et al.

(10) Patent No.: US 7,657,500 B2
(45) Date of Patent: Feb. 2, 2010

(54) CONCURRENT EXTENSIBLE CUCKOO HASHING

(75) Inventors: Nir N. Shavit, Cambridge, MA (US); Maurice P. Herlihy, Brookline, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 381 days.

(21) Appl. No.: 11/717,453

(22) Filed: Mar. 12, 2007

(65) Prior Publication Data

US 2008/0228691 A1 Sep. 18, 2008

(51) Int. Cl.
| | | |
|---|---|---|
| G06F 7/00 | (2006.01) | |
| G06F 17/00 | (2006.01) | |
| G06F 17/30 | (2006.01) | |
| G06F 12/00 | (2006.01) | |
| G06F 9/26 | (2006.01) | |
| G06F 9/34 | (2006.01) | |

(52) U.S. Cl. ............................ 707/1; 707/8; 707/100; 711/216

(58) Field of Classification Search ................ None
See application file for complete search history.

(56) References Cited

U.S. PATENT DOCUMENTS

| | | | | |
|---|---|---|---|---|
| 5,796,939 | A * | 8/1998 | Berc et al. ................... 714/47 |
| 6,304,949 | B1 * | 10/2001 | Houlsdworth ............... 711/170 |
| 6,442,553 | B1 * | 8/2002 | Take ........................... 707/100 |
| 6,578,131 | B1 * | 6/2003 | Larson et al. ................ 711/216 |
| 6,757,794 | B2 * | 6/2004 | Cabrera et al. ............... 711/156 |
| 6,772,155 | B1 * | 8/2004 | Stegelmann ................... 707/8 |
| 6,952,692 | B1 * | 10/2005 | Bhattiprolu et al. ............ 707/3 |
| 2004/0059734 | A1 * | 3/2004 | Smith et al. ..................... 707/9 |
| 2008/0021908 | A1 * | 1/2008 | Trask et al. .................. 707/100 |
| 2008/0115042 | A1 * | 5/2008 | Akkary et al. ............... 714/806 |
| 2008/0115142 | A1 * | 5/2008 | Scheuer ....................... 718/104 |
| 2008/0263044 | A1 * | 10/2008 | Cantrill ......................... 707/8 |

OTHER PUBLICATIONS

Rasmus Pagh and Flemming Friche Rodler, Cuckoo Hashing, Dec. 8, 2003, pp. 1-27.*

* cited by examiner

*Primary Examiner*—Mohammad Ali
*Assistant Examiner*—Patrick A Darno
(74) *Attorney, Agent, or Firm*—Brooks Kushman P.C.

(57) ABSTRACT

Concurrent cuckoo hashing is performed on a hash table that includes a number of locations; each may hold a value. A plurality of processes may concurrently execute on the table; each process includes a sequence of operations, which are divided into a number of phases. Each phase corresponds to one operation in the sequence. An overflow buffer is provided for each location in the table. Each overflow buffer may hold a value displaced from its corresponding location in the table. A plurality of sequences of operations is concurrently executed. Each phase in a sequence executes by acquiring one or two locks on two locations in the table; a lock acts on a location and its overflow buffer. An operation of a phase is then executed. If, on conclusion of the phase execution, any overflow buffer holds a value, the execution is repeated until all overflow buffers are empty.

20 Claims, 14 Drawing Sheets

601 PERFORM CONCURRENT CUCKOO HASHING ON A HASH TABLE, WHEREIN A HASH TABLE INCLUDES A NUMBER OF LOCATIONS THAT MAY EACH HOLD A VALUE, WHEREIN A PLURALITY OF PROCESSES MAY CONCURRENTLY EXECUTE ON THE HASH TABLE, AND WHEREIN EACH PROCESS COMPRISES A SEQUENCE OF OPERATIONS

602 DIVIDE EACH SEQUENCE OF OPERATIONS INTO A NUMBER OF PHASES, WHEREIN EACH PHASE CORRESPONDS TO ONE OPERATION IN THE SEQUENCE OF OPERATIONS

603 PROVIDE AN OVERFLOW BUFFER FOR EACH LOCATION IN THE HASH TABLE, WHEREIN EACH OVERFLOW BUFFER IS CAPABLE OF HOLDING A VALUE DISPLACED FROM ITS CORRESPONDING LOCATION IN THE HASH TABLE

604 CONCURRENTLY EXECUTE A PLURALITY OF SEQUENCES OF OPERATIONS, WHEREIN FOR EACH PHASE IN A SEQUENCE OF OPERATIONS, THE PHASE EXECUTES BY

605 ACQUIRING AT MOST TWO LOCKS ON TWO LOCATIONS IN THE HASH TABLE PRIOR TO EXECUTING AN OPERATION OF A PHASE, WHEREIN A LOCK ACTS ON A LOCATION IN THE HASH TABLE AND THE OVERFLOW BUFFER FOR THAT LOCATION

606 EXECUTING AN OPERATION OF A PHASE ON THE HASH TABLE

607 IF, UPON CONCLUSION OF THE EXECUTION OF THE PHASE, ANY OVERFLOW BUFFER HOLDS A VALUE, REPEAT THE EXECUTION OF THAT PHASE UNTIL ALL OVERFLOW BUFFERS ARE EMPTY

608 DETECT THAT THE AMOUNT OF DATA STORED IN OVERFLOW BUFFERS EXCEEDS A THRESHOLD

609 IN RESPONSE, EXECUTE A RESIZING OPERATION ON THE HASH TABLE

610 IN RESPONSE, EXECUTE A RESIZING OPERATION ON THE HASH TABLE, WHEREIN THE HASH TABLE IS LOCATED IN A SPECIFIC AREA OF MEMORY

611 INFORM ANY PROCESSES WAITING FOR ACCESS TO THE HASH TABLE (I) THAT THE LOCATION OF THE HASH TABLE HAS CHANGED DUE TO THE RESIZING OPERATION AND (II) OF THE CHANGED LOCATION

FIG. 6

```
1  public abstract class PhasedCuckooHashSet<T> {
2       int capacity ;
3       volatile T [][] table ;
4       volatile List<T>[][] overflow;
5       public PhasedCuckooHashSet(int capacity) {
6               table = (T [][]) new Object[2][ capacity ];
7               overflow = (List<T>[][]) new List [2][ capacity ];
8               for ( int i = 0; i < 2; i++) {
9                       for ( int j = 0; j < capacity; j++) {
10                              overflow[ i ][ j ] = new ArrayList<T>();
11                      }
12              }
13      }
14      ...
15 }
```

FIG. 7

```
16 public boolean remove(T x) {
17      acquire (x);
18      try {
19              int h0 = hash0(x);
20              if (x. equals( table [0][ h0])) {
21                      table [0][ h0] = null;
22                      return true;
23              } else if (overflow [0][ h0]. contains (x)) {
24                      overflow [0][ h0].remove(x);
25                      return true;
26              } else {
27                      int h1 = hash1(x);
28                      if (x. equals( table [1][ h1])) {
29                              table [1][ h1] = null;
30                              return true;
31                      } else if (overflow [1][ h1]. contains (x)) {
32                              overflow [1][ h1].remove(x);
33                              return true;
34                      }
35              }
36              return false ;
37      } finally {
38              release (x);
39      }
40 }
```

FIG. 8

```
41 public boolean add(T x) {
42     T y = null;
43     int h0 = hash0(x), h1 = hash1(x);
44     acquire (x);
45     try {
46         if ( contains (x)) {
47             return false ;
48         }
49         if ( table [0][ h0] == null) { // decide where to put it
50             table [0][ h0] = x;
51             return true;
52         } else if ( table [1][ h1] == null) {
53             table [1][ h1] = x;
54             return true;
55         }
56         y = table [0][ h0];
57         table [0][ h0] = x;
58         overflow [0][ h0].add(y);
59     } finally {
60         release (x);
61     }
62     if (! relocate (y)) {
63         resize ();
64     }
65     return true; // x must have been present
66 }
```

FIG. 9

```
67 protected boolean relocate(T y) {
68      int i = 0, j = 1;
69      int hi = 0, hj = 0;
70      T z = null;
71      for ( int round = 0; round < LIMIT; round++) {
72              acquire (y);
73              try {
74                      switch ( i ) {
75                              case 0: hi = hash0(y); hj = hash1(y); break;
76                              case 1: hi = hash1(y); hj = hash0(y); break;
77                      }
78                      if (overflow[ i ][ hi ]. remove(y)) {
79                              if ( table [ i ][ hi ] == null) {
80                                      table [ i ][ hi ] = y;
81                                      return true;
82                              } else if ( table [ j ][ hj ] == null) {
83                                      table [ j ][ hj ] = y;
84                                      return true;
85                              } else {
86                                      z = table[ j ][ hj ];
87                                      overflow[ j ][ hj ]. add(z);
88                                      table [ j ][ hj ] = y;
89                              }
90                      }
91              } finally {
92                      release (y);
93              }
94              y = z;
95              i = 1 - i;
96              j = 1 - j;
97      }
98      return false ;
99 }
```

FIG. 10

```
1 public class StripedCuckooHashSet<T> extends PhasedCuckooHashSet<T>{
2        final ReentrantLock [][] lock ;
3
4        public StripedCuckooHashSet(int capacity) {
5                super(capacity );
6                lock = new ReentrantLock[2][capacity];
7                for ( int i = 0; i < 2; i++) {
8                        for ( int j = 0; j < capacity; j++) {
9                                lock [ i ][ j ] = new ReentrantLock();
10                       }
11               }
12       }
13       ...
14 }
```

FIG. 11

```
15 public final void acquire (T x) {
16      lock [0][ hash0(x) % lock [0]. length ]. lock ();
17      lock [1][ hash1(x) % lock [1]. length ]. lock ();
18 }
19 public final void release (T x) {
20      lock [0][ hash0(x) % lock [0]. length ]. unlock ();
21      lock [1][ hash1(x) % lock [1]. length ]. unlock ();
22 }
```

FIG. 12

```
23 public void resize () {
24     int oldCapacity = capacity;
25     for ( int i = 0; i < lock [0]. length ; i++) {
26         lock [0][ i ]. lock ();
27     }
28     try {
29         if ( capacity != oldCapacity) { // someone else resized first
30             return;
31         }
32         T [][] oldTable = table;
33         List<T>[][] oldOverflow = overflow;
34         capacity = 2 * capacity ;
35         table = (T [][]) new Object[2][ capacity ];
36         overflow = (List<T>[][]) new List [2][ capacity ];
37         for ( int i = 0; i < 2; i++) {
38             for ( int j = 0; j < capacity; j++) {
39                 overflow[ i ][ j ] = new ArrayList<T>();
40             }
41         }
42         initializeFrom (oldTable , oldOverflow);
43     } finally {
44         for (Lock l : lock [0])
45             l .unlock ();
46     }
47 }
```

FIG. 13

```
1  public class RefinableCuckooHashSet<T> extends PhasedCuckooHashSet<T>{
2      AtomicMarkableReference<Thread> owner;
3      volatile ReentrantLock [][] locks ;
4      public RefinableCuckooHashSet(int capacity) {
5              super(capacity );
6              locks = new ReentrantLock[2][capacity];
7              for ( int i = 0; i < 2; i++) {
8                      for ( int j = 0; j < capacity; j++) {
9                              locks [ i ][ j ] = new ReentrantLock();
10                     }
11             }
12             owner = new AtomicMarkableReference<Thread>(null, false);
13     }
14     ...
15 }

16 public void acquire (T x) {
17     boolean[] mark = ftrueg;
18     Thread me = Thread.currentThread();
19     Thread who;
20     while (true) {
21             do { // wait until not resizing
22                     who = owner.get(mark);
23             } while (mark[0] && who != me);
24             ReentrantLock [][] oldLocks = this. locks ;
25             ReentrantLock oldLock0 = oldLocks[0][hash0(x) % oldLocks[0]. length ];
26             ReentrantLock oldLock1 = oldLocks[1][hash1(x) % oldLocks[1]. length ];
27             oldLock0.lock (); // acquire locks
28             oldLock1.lock ();
29             who = owner.get(mark);
30             if ((!mark[0] jj who == me) && this.locks == oldLocks) { // recheck
31                     return;
32             } else { // unlock & try again
33                     oldLock0.unlock ();
34                     oldLock1.unlock ();
35             }
36     }
37 }
38 public void release (T x) {
39     locks [0][ hash0(x )]. unlock (); // release locks
40     locks [1][ hash1(x )]. unlock ();
41 }
```

FIG. 14A

```
42 public void resize () {
43     int oldCapacity = capacity;
44     boolean[] mark = ffalseg;
45     int newCapacity = 2 ¤ oldCapacity;
46     Thread me = Thread.currentThread();
47     if (owner.compareAndSet(null, me, false, true)) {
48          try {
49               if ( capacity != oldCapacity) { // someone else resized first
50                    return;
51               }
52               quiesce ();
53               capacity = 2 * capacity ;
54               T [][] oldTable = table;
55               List<T>[][] oldOverflow = overflow;
56               table = (T [][]) new Object[2][ capacity ];
57               locks = new ReentrantLock[2][capacity];
58               overflow = (List<T>[][]) new List [2][ capacity ];
59               for ( int i = 0; i < 2; i++) {
60                    for ( int j = 0; j < capacity; j++) {
61                         overflow[ i ][ j ] = new ArrayList<T>(OVERFLOW SIZE);
62                         locks [ i ][ j ] = new ReentrantLock();
63                    }
64               }
65               initializeFrom (oldTable , oldOverflow);
66          } finally {
67               owner.set( null , false ); // restore prior state
68          }
69     }
70 }

71 protected void quiesce () {
72     for (ReentrantLock lock : locks [0]) {
73          while (lock . isLocked()) fg // spin
74     }
75 }
```

FIG. 14B

CONCURRENT EXTENSIBLE CUCKOO HASHING

BACKGROUND

This application relates to hashing techniques used by computer systems and, more particularly, to hashing techniques employed in computer systems that may include multicore and/or multithread processor elements.

Hashing is a technique commonly used in sequential set implementations to ensure that these method calls take constant time on the average. A hash set, also known as a hash table, is an efficient way to implement sets of items. A hash set is typically implemented as an array, called a table. Each table element is a reference to one or more items. A hash function maps items to integers so that distinct items almost always map to distinct values. To add, remove, or test an item for membership, apply the hash function to the item, modulo the table size, to identify the table entry associated with that item. In other words, hash the item.

In some hash-based set algorithms, each table element refers to a single item, an approach known as open addressing. In others, each table element refers to a set of items, traditionally called a bucket; this approach is known as closed addressing.

Any hash set algorithm must deal with collisions. Collisions are when two distinct items hash to the same table entry. Open addressing algorithms typically resolve collisions by applying alternative hash functions to test alternative table elements. Closed addressing algorithms place colliding items in the same bucket, until that bucket becomes too full. In both types of algorithms, it is sometimes necessary to resize the table. In open addressing algorithms, the table may become too full to find alternative table entries, and in closed addressing algorithms, buckets may become too large to search efficiently. Open addressing schemes have the potential performance advantage of involving one level less of indirection in accessing an item in the table, since the item is placed directly in an array, not in a linked list implementing a bucket.

Cuckoo hashing is a sequential hashing algorithm in which a newly-added item displaces any earlier item occupying the same slot. For a hash set of size N=2k, where k is the number of items in a table (array), two arrays (e.g., table[0] and table[1]) that form a table and two independent hash functions ($h_0$ and $h_1$) are used to map the set of possible keys to entries in the arrays. To test whether a value, denoted as X, is contained in the set, the function contains(X) is used. This function tests whether either table[0][$h_0$(X)] or table[1][$h_1$(X)] results in X. Similarly, the remove function, remove(X), checks whether X is in either array (table[0][$h_0$(X)] or table[1][$h_1$(X)], i.e., by using the contains(X) function) and then removes X if it is found.

An example of a sequential cuckoo hashing add( ) method is shown below:

```
1   public boolean add(T x) {
2       if ( contains (x)) {
3           return false ;
4       }
5       for ( int i = 0; i < LIMIT; i++) {
6           if ((x = swap(hash0(x), x)) == null) {
7               return true;
8           } else if ((x = swap(hash1(x), x)) == null) {
9               return true;
10          }
11      }
12      resize ( );
13      add(x);
14  }
```

The add(x) method successively "kicks out" conflicting items until every key has a slot. To add x, swap x with y, the current occupant of table [0] [$h_0$(x)] (Line 6). If the prior value y was null, the method is done (Line 7). Otherwise, swap the newly nest-less value y for the current occupant of table [1][$h_1$(y)] in the same way (Line 8). As before, if the prior value was null, the method is done. Otherwise, continue swapping entries (alternating tables) until an empty slot is found.

An empty slot might not be found, either because the table is full, or because the sequence of displacements forms a cycle. An upper limit is therefore needed on the number of successive displacements that may be undertaken (Line 5). When this limit is exceeded, resize the hash table, choose new hash functions (Line 12), and start over (Line 13).

Sequential cuckoo hashing is attractive for its simplicity. It provides constant time contains( ) and remove( ) methods, and it may be shown that over time, the average number of displacements caused by each add( ) call will be constant. Experimental evidence shows that sequential cuckoo hashing works well in practice.

SUMMARY

Conventional sequential cuckoo hashing suffers from a variety of problems when it is applied to multicore or multithread processors that are increasingly common in computer systems. With multicore or multithread processors, any number of sequences of operations may be operating on the same data, such as a hash table, at the same time. Since conventional sequential cuckoo hashing requires that all values in a hash table be locked until a single operation has finished running, this creates bottlenecks among threads or processes that are all using the same table while executing. In other words, if five processes are all supposed to be acting on the same table simultaneously, but one of those is a sequential cuckoo hashing process, while that process locks the table until it is done, the remaining processes must wait for the locks to be released before they are able to use the table. Such bottlenecks decrease or even eliminate a significant advantage to using a multicore or multithread processor, namely that multiple processes or threads are able to execute simultaneously, thus improving processor performance.

Embodiments of the invention overcome these and other problems by breaking operations down into a number of phases, by reducing the number of locks needed by a phase during its execution, and by creating overflow buffers, where each location in a hash table has a corresponding overflow buffer. First, by dividing a sequence of operations into small pieces, or phases, the concurrent extensible cuckoo hashing application described herein eliminates the need to lock an entire hash table during execution of an operation. Rather, a phase is defined to require at most two locks, depending on the hashing functions used and the operation to be performed. Each lock is for a particular location on a table, and also acts on the overflow buffer that corresponds to that location. When a phase completes its execution, any locks are released. Because a phase is a simple operation, and only acts on at most two locations and their corresponding overflow buffers, the chances of bottlenecks are significantly reduced, if not eliminated altogether.

During execution of an operation, i.e. a phase, an operation may need to displace a value from a location in the table. Instead of continuing the execution so as to move values around until there are no displaced values, or until the table needs to be resized, as is done in conventional sequential cuckoo hashing, the concurrent extensible cuckoo hashing application described herein moves a displaced value from its location into an overflow buffer corresponding to that location. When the phase has finished executing, any overflow buffers are then emptied without requiring every other process that may be executing on the table to wait for this to occur before accessing the table. Further, the concurrent extensible cuckoo hashing application is aware of the overflow buffers, such that the application will look into the overflow buffers if a value expected to be in a location in the table is not found. Overflow buffers may be defined to hold a number of values at the same time, further improving performance.

More specifically, in an embodiment there is provided a method of performing concurrent cuckoo hashing on a hash table. The hash table includes a number of locations that may each hold a value. A plurality of processes may concurrently execute on the hash table, and each process comprises a sequence of operations. The method includes dividing each sequence of operations into a number of phases, wherein each phase corresponds to one operation in the sequence of operations; providing an overflow buffer for each location in the hash table, wherein each overflow buffer is capable of holding a value displaced from its corresponding location in the hash table; concurrently executing a plurality of sequences of operations, wherein for each phase in a sequence of operations, the phase executes by: acquiring at most two locks on two locations in the hash table prior to executing an operation of a phase, wherein a lock acts on a location in the hash table and the overflow buffer for that location; and executing an operation of a phase on the hash table; and if, upon conclusion of the execution of the phase, any overflow buffer holds a value, repeating the execution of that phase until all overflow buffers are empty.

In a related embodiment, providing may include providing an overflow buffer for each location in the hash table, wherein each overflow buffer is capable of holding multiple values displaced from its corresponding location in the hash table.

In another related embodiment, executing an operation of a phase may include executing a contain operation on the hash table by: executing two hash functions on the hash table to determine two locations in the table; and searching the determined locations and their corresponding overflow buffers for a particular value. In a further related embodiment, executing an operation of a phase may further include executing an add operation on the hash table by: if the particular value searched for in the hash table is not located, determining if either of the determined locations is empty; if so, placing the particular value in an empty determined location; if not, moving a current value of a determined location to the overflow buffer corresponding to that location, and placing the particular value in that determined location. In another further related embodiment, executing an operation of a phase may further include executing a remove operation on the hash table by: if the particular value searched for in the hash table is located, deleting the particular value from the hash table.

In yet another related embodiment, the method may include detecting that the amount of data stored in overflow buffers exceeds a threshold; and in response, executing a resizing operation on the hash table. In a further related embodiment, the hash table may be located in a specific area of memory, and executing a resizing operation may include in response, executing a resizing operation on the hash table; and informing any processes waiting for access to the hash table (i) that the location of the hash table has changed due to the resizing operation and (ii) of the changed location.

In another embodiment, there is provided a computer system. The computer system includes a memory; a processor; a display; a communications interface; and an interconnection mechanism coupling the memory, the processor, the display, and the communications interface, allowing communication there between. The memory is encoded with a concurrent extensible cuckoo hashing application, that when executed in the processor, provides a concurrent extensible cuckoo hashing process that performs concurrent cuckoo hashing on a hash table. The hash table includes a number of locations that may each hold a value. A plurality of processes may concurrently execute on the hash table, and each process comprises a sequence of operations. The concurrent extensible cuckoo hashing process causes the computer system to perform the steps of: dividing each sequence of operations into a number of phases, wherein each phase corresponds to one operation in the sequence of operations; providing an overflow buffer for each location in the hash table, wherein each overflow buffer is capable of holding a value displaced from its corresponding location in the hash table; concurrently executing a plurality of sequences of operations, wherein for each phase in a sequence of operations, the phase executes by: acquiring at most two locks on two locations in the hash table prior to executing an operation of a phase, wherein a lock acts on a location in the hash table and the overflow buffer for that location; and executing an operation of a phase on the hash table; and if, upon conclusion of the execution of the phase, any overflow buffer holds a value, repeating the execution of that phase until all overflow buffers are empty.

In another embodiment, there is provided a computer program product, stored on computer readable medium, to perform concurrent cuckoo hashing on a hash table. A hash table includes a number of locations that may each hold a value. A plurality of processes may concurrently execute on the hash table, and each process comprises a sequence of operations. The computer program product includes computer program code for dividing each sequence of operations into a number of phases, wherein each phase corresponds to one operation in the sequence of operations; computer program code for providing an overflow buffer for each location in the hash table, wherein each overflow buffer is capable of holding a value displaced from its corresponding location in the hash table; computer program code for concurrently executing a plurality of sequences of operations, wherein for each phase in a sequence of operations, the phase executes by: computer program code for acquiring at most two locks on two locations in the hash table prior to executing an operation of a phase, wherein a lock acts on a location in the hash table and the overflow buffer for that location; and computer program code for executing an operation of a phase on the hash table; and if, upon conclusion of the execution of the phase, any overflow buffer holds a value, computer program code for repeating the execution of that phase until all overflow buffers are empty.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations may be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein may be employed in computerized devices and software systems for such devices such as those manufactured by Sun Microsystems, Inc. of Santa Clara, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 6 illustrates a flowchart of a procedure performed by the system of FIG. 1 to resize the hash table during execution of the concurrent extensible cuckoo hashing application.

FIG. 7 is an example of code that defines fields and constructor for a class used in implementing the concurrent extensible cuckoo hashing application.

FIG. 8 is an example of code that defines the remove operation of the concurrent extensible cuckoo hashing application.

FIG. 9 is an example of code that defines the add operation of the concurrent extensible cuckoo hashing application.

FIG. 10 is an example of code that defines the relocate operation of the concurrent extensible cuckoo hashing application.

FIG. 11 is an example of code that defines fields and constructor for another class used in implementing the concurrent extensible cuckoo hashing application.

FIG. 12 is an example of code that defines the acquire and release operations of the concurrent extensible cuckoo hashing application.

FIGS. 13, 14A, and 14B are examples of code that define the resize operations of the concurrent extensible cuckoo hashing application.

DETAILED DESCRIPTION

Embodiments disclosed herein include a lock-based implementation of an extensible open-address cuckoo hash table running on current multiprocessor/multicore architectures. Concurrent add, remove, and find operations are provided, each with an expected ( ) (1) cost. Efficient hash tables are key to many concurrent data structures, in particular in the design of software and hybrid transactional memory algorithms in which a hash table is used to maintain the versioned-write-locks or object-records associated with memory locations. A concurrent cuckoo hash table such as described in embodiments below comprises very simple code, easily implementable using only load, store, and compare-and-swap operations. The new mathematical structure described below is a phase-based version of the sequential cuckoo add( ) method, a way of implementing cascading sequences of element swaps in the hash table so as to minimize (reduce to two) the number of locks that need to be held simultaneously. This helps alleviate the drawback that long hash table swap sequences may have a problem completing even if they were to be implemented using transactions supported in hardware. The concurrent cuckoo hash table as described herein, though lock-based, may be resized without the expensive process of acquiring the locks on all the table entries one after the other. Finally, unlike existing hash tables (such as those in the Java concurrency package), the hash table disclosed herein may use increasingly larger sets of locks to provide increased levels of disjoint-access parallelism as the table size increases.

Figure 1:
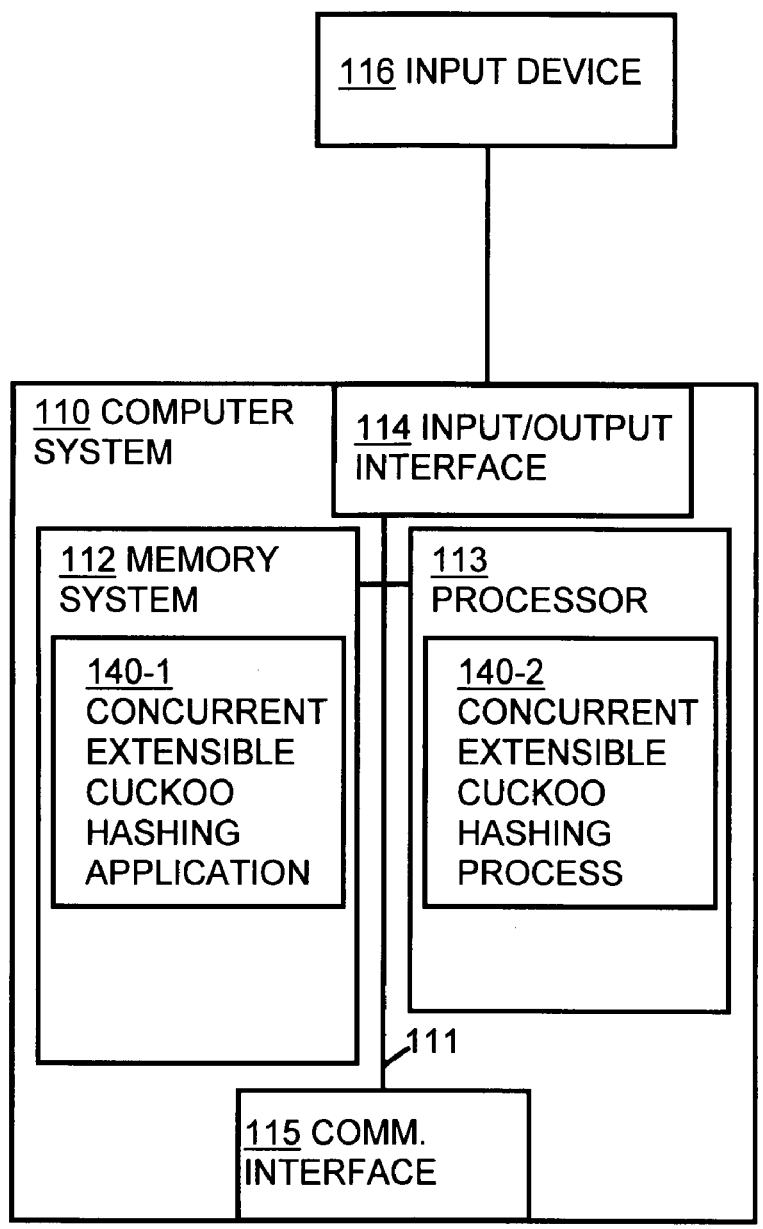
FIG. 1 illustrates an example computer system architecture for a computer system according to one embodiment disclosed herein.

FIG. 1 is a block diagram illustrating example architecture of a computer system 110 that executes, runs, interprets, operates or otherwise performs a concurrent extensible cuckoo hashing application 140-1 and a concurrent extensible cuckoo hashing process 140-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a pointing device, keyboard, mouse, etc.) couples to processor 113 through input/output interface 114, and enables a user (not shown) to provide input commands to the concurrent extensible cuckoo hashing application 140-1 and the concurrent extensible cuckoo hashing process 140-2. The communications interface 115 enables the computer system 110 to communicate with other devices (i.e., other computers) on a network (not shown).

The memory system 112 is any type of computer readable medium and in this example is encoded with a concurrent extensible cuckoo hashing application 140-1. The concurrent extensible cuckoo hashing application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of The concurrent extensible cuckoo hashing application 140-1. Execution of concurrent extensible cuckoo hashing application 140-1 in this manner produces processing functionality in a concurrent extensible cuckoo hashing process 140-2. In other words, The concurrent extensible cuckoo hashing process 140-2 represents one or more portions of runtime instances of The concurrent extensible cuckoo hashing application 140-1 (or the entire application 140-1) performing or executing within or upon the processor 113 in the computerized device 110 at runtime.

Figure 2:
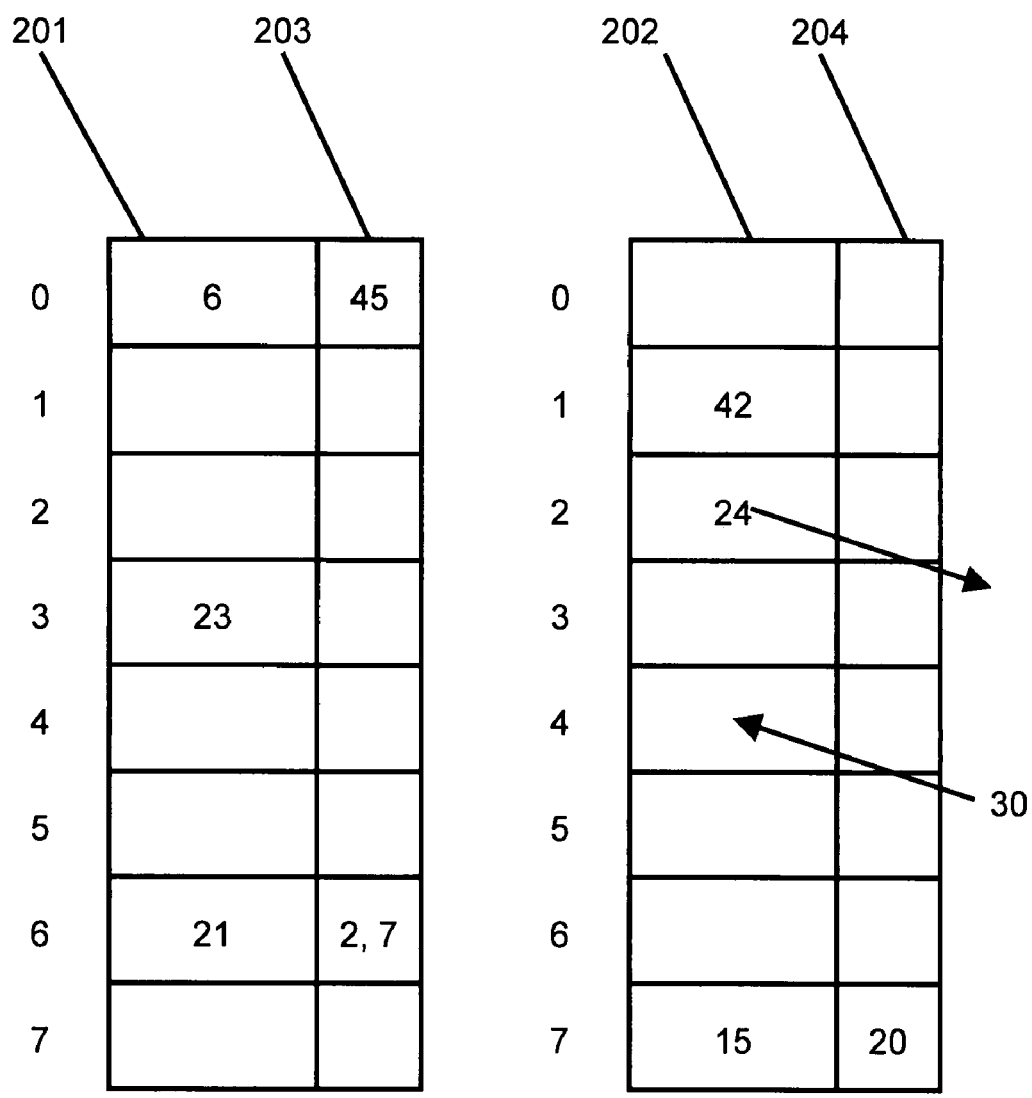
FIG. 2 illustrates an example hash table acted upon by the concurrent extensible cuckoo hashing application described herein.
Figure 3:
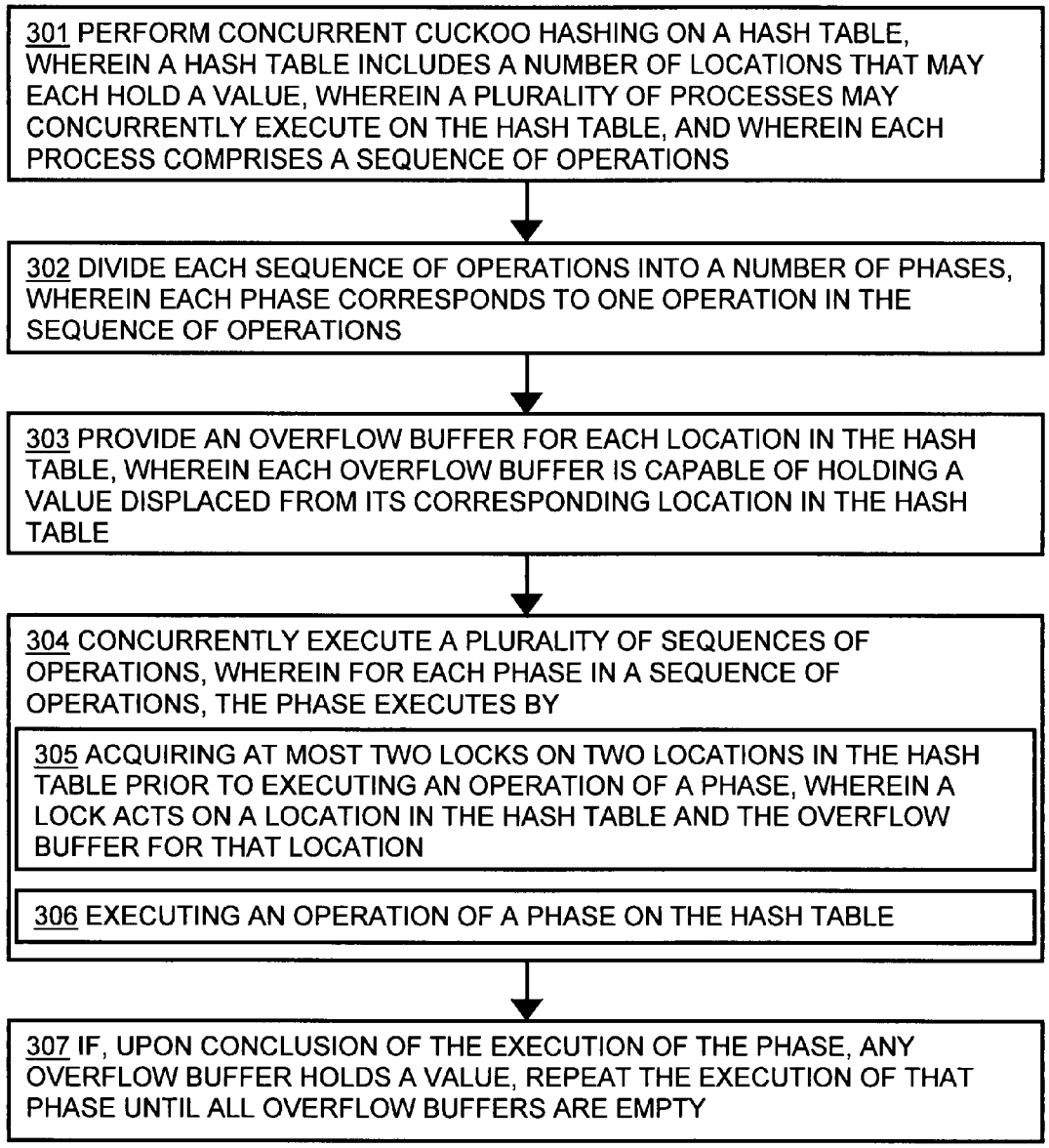
FIG. 3 illustrates a flowchart of a procedure performed by the system of FIG. 1 when executing the concurrent extensible cuckoo hashing application.

FIG. 2 illustrates an example hash table 200, shown as two arrays 201 and 202, each with a corresponding number of overflow buffers 203 and 204, according to embodiments described herein. Though the example hash table 200 is of a particular size, a hash table in accordance with embodiments described herein may be of any size. In FIG. 2, values in the hash table 200 may be moved to different locations in either array 201 or 202, or temporarily moved to overflow buffers 203 or 204, provided according to embodiments described herein. Each of the overflow buffers 203 and 204 may hold one or more values, as is described in greater detail below.

A number of flowcharts illustrating embodiments of the invention are shown in FIGS. 2-5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

More specifically, FIGS. 3-6 show flowcharts of various embodiments described herein. Further, FIGS. 7-14B show example code for various embodiments described herein, and are referred to throughout the discussion of FIGS. 2-6 below.

The hash table 200 shown in FIG. 2 includes characteristics according to embodiments described herein. For example, a hash table upon which the concurrent extensible cuckoo hashing process 140-2 acts includes a number of locations that may each hold a value. Further, a plurality of processes may concurrently execute on the hash table. Each such process includes a sequence of operations.

The principal obstacle to making a sequential cuckoo hashing algorithm concurrent is the add( ) method's need to perform a long sequence of swaps. To address this, embodiments disclosed herein define an alternative cuckoo hashing algorithm, the PhasedCuckooHashSet<T> class, an example of which is shown in FIG. 7. Each method call is broken up into a sequence of phases, where each phase adds, removes, or displaces a single item x, as will be described further below. Thus, the concurrent extensible cuckoo hashing process 140-2 divides each sequence of operations into a number of phases, step 302. Each phase corresponds to one operation in the sequence of operations that a process performs on the hash table.

To bridge successive phases, a 2-by-L array of buffers, overflow[ ][ ] (Lines 4 and 8 in FIG. 7) is implemented by the concurrent extensible cuckoo hashing process 140-2. This field is declared volatile because it may grow if the hash table is resized. Each overflow[ ] buffer is implemented as an ArrayList<T>, implying that an add( ) to it is always successful. Overflow buffers hold displaced items after they have been swapped out of one hash table entry or location, but before they have been swapped into another. No item appears more than once in the hash table or overflow arrays. Thus, the concurrent extensible cuckoo hashing process 140-2 provides an overflow buffer for each location in the hash table, step 303, wherein each overflow buffer is capable of holding a value displaced from its corresponding location in the hash table.

Overflow buffers are implemented as sets that provide the following methods or operations, which return Boolean values. The add operation, add(x), places x in the hash table. The add operation returns true if x was absent, and false otherwise. The remove operation, remove(x), deletes x from the hash table. The remove operation returns true if x was present, and false otherwise. The contain operation, contains(x), returns true if x is present in the table or an overflow buffer, and false otherwise. These operations, all of which may be performed by the concurrent extensible cuckoo hashing process 140-2, are described in greater detail below.

To postpone a discussion of synchronization, the PhasedCuckooHashSet<T> class is defined to be abstract, that is, it does not implement all its methods or operations. The PhasedCuckooHashSet<T> class has the following abstract methods or operations whose implementation is discussed further below: the acquire(x) method or operation acquires all the locks necessary to manipulate item x, as described below, release (x) releases them, and resize( ) resizes the set. The acquire(x) method or operations is required to be re-entrant.

Regardless of which type of operation the concurrent extensible cuckoo hashing process 140-2 performs, the concurrent extensible cuckoo hashing process 140-2 concurrently executes a plurality of sequences of operations, step 304. This involves at least two separate steps for each phase in a sequence of operations. First, the concurrent extensible cuckoo hashing process 140-2 acquires at most two locks on two locations in the hash table prior to executing an operation of a phase, step 305. A lock acts on a location in the hash table and the overflow buffer for that location, such that no other process is able to act on the data in a locked location and its corresponding locked overflow buffer.

Using a single lock to implement the concurrent extensible cuckoo hash algorithm would result in an algorithm that would be easy to understand and easy to implement. Unfortunately, it would also be a sequential bottleneck. Method calls would take effect in a one-at-a-time order, even when there is no logical reason for them to do so.

Thus, instead of using a single lock to synchronize the entire set, the set is split into independently-synchronized pieces. This is accomplished by using a technique called lock striping. The set is initialized with an array lock[ ] of L locks, and an array table [ ] of N=L buckets. Although these arrays are initially the same capacity, the table [ ] and overflow[ ] will grow when the set is resized, but lock[ ] will not. The lock lock[i] [j] protects table [i][k] and overflow[i] [k]. Every now and then, the table and overflow array capacities N are doubled without changing the lock array size L, so that lock i eventually protects each table entry j, where j=i (mod L). The acquire(x) and release ( ) methods use x's hash code to pick which lock to acquire or release.

There are two reasons not to grow the lock array every time the table is increased in size, if the table is increased in size as described below. First, associating a lock with every table entry could consume too much space, especially when tables are large and contention is low. Second, while resizing the table is straightforward, resizing the lock array while in use is more complex, as discussed below.

The StripedCuckooHashSet<T> class extends PhasedCuckooHashSet<T>, providing a fixed 2-by-L array of reentrant locks. As usual, lock[i][j] protects table [i][k] and overflow[i] [k], where k (mod L)=j. FIG. 11 shows the StripedCuckooHashSet<T> class's fields and constructor. The constructor calls the PhasedCuckooHashSet<T> constructor (Line 5) and then initializes the lock array.

The StripedCuckooHashSet<T> class's acquire(x) method, example code of which is shown in FIG. 12, locks lock[0][$h_0$(x)] and lock[1][$h_1$(x)] in that order, to avoid deadlock. The release (x) method, example code of which is also shown in FIG. 12, unlocks those locks. Locks are unlocked only after the phase completes.

With the locks acquired, the concurrent extensible cuckoo hashing process 140-2 executes an operation of a phase on the hash table, step 306. The particulars of the three main types of operations, contain( ), remove( ), and add( ), are described in greater detail below with reference to FIG. 2.

If, upon conclusion of the execution of the phase, any overflow buffer holds a value, the concurrent extensible cuckoo hashing process 140-2 repeats the execution of that phase until all overflow buffers are empty, step 307. This may be achieved through use of the relocate( ) method or operation, example code of which is shown in FIG. 10. The relocate( ) operation moves y from overflow[0][$h_0$(y)] to table [1][$h_1$(y)]. If that move displaces an item z, then the relocate operation moves z from overflow[1][$h_1$(z)] to table [0][$h_0$(y)]. The relocate operation continues in this way until either it fills an empty table [ ] entry and returns true (Lines 81 and 84) or it runs for too long, and returns false, indicating that the caller should resize the table (Line 98), which is described in greater detail below.

For example, if the overflow buffer 203 corresponding to location 0 in the array 201 of the hash table 200 has a value in it, say 45 as shown in FIG. 2, after a phase has finished executing, the concurrent extensible cuckoo hashing process 140-2 will execute that phase again to empty that overflow buffer. During that execution, the value 45 may be placed into location 3 in the array 201 of the hash table 200. As location 3 currently holds a value, 23, the 23 will be displaced into the corresponding overflow buffer for location 3, and 45 will be placed into location 3. The concurrent extensible cuckoo hashing process 140-2 will repeat this process until all overflow buffers are empty.

Figure 4:
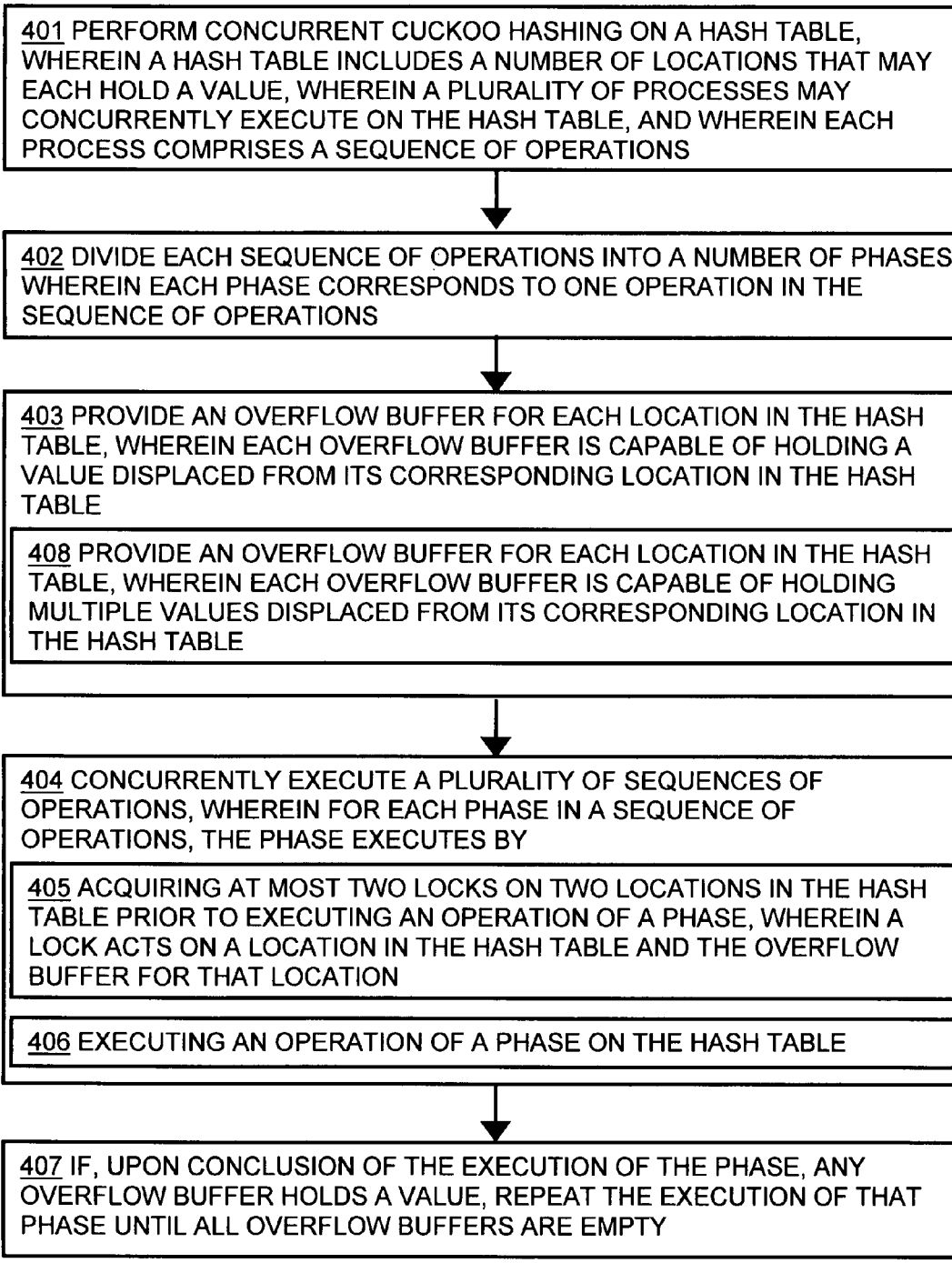
FIG. 4 illustrates a flowchart of a procedure performed by the system of FIG. 1 when overflow buffers provided by the concurrent extensible cuckoo hashing application are capable of holding multiple values displaced from a location in the hash table.

FIG. 4 illustrates a flowchart where the concurrent extensible cuckoo hashing process 140-2 provides overflow buffers that may hold multiple values displaced from locations in a hash table. As before, the concurrent extensible cuckoo hashing process 140-2 divides each sequence of operations into a number of phases, step 402, and the concurrent extensible cuckoo hashing process 140-2 provides an overflow buffer for each location in the hash table, step 403. Each overflow buffer that the concurrent extensible cuckoo hashing process 140-2 provides is capable of holding a value displaced from its corresponding location in the hash table. In this situation, the concurrent extensible cuckoo hashing process 140-2 may provide an overflow buffer for each location in the hash table, step 408, wherein each overflow buffer is capable of holding multiple values displaced from its corresponding location in the hash table. In other words, if a number of processes are displacing values from a location in the hash table into the same overflow buffer, the overflow buffer is capable of handling a plurality of values, such that the concurrent extensible cuckoo hashing process 140-2 does not necessarily have any need to resize the table at this time. Examples of such overflow buffers may be seen in FIG. 2, such as the overflow buffer 203 that corresponds to location 6 in the array 201 of the hash table 200, which holds two values, 2 and 7.

The concurrent extensible cuckoo hashing process 140-2 next concurrently executes a plurality of sequences of operations, step 404. This involves at least two separate steps for each phase in a sequence of operations. First, the concurrent extensible cuckoo hashing process 140-2 acquires at most two locks on two locations in the hash table prior to executing an operation of a phase, step 405. With the locks acquired, the concurrent extensible cuckoo hashing process 140-2 executes an operation of a phase on the hash table, step 406, as is described in greater detail below. If, upon conclusion of the execution of the phase, any overflow buffer holds a value, the concurrent extensible cuckoo hashing process 140-2 repeats the execution of that phase until all overflow buffers are empty, step 407.

Figure 5A:
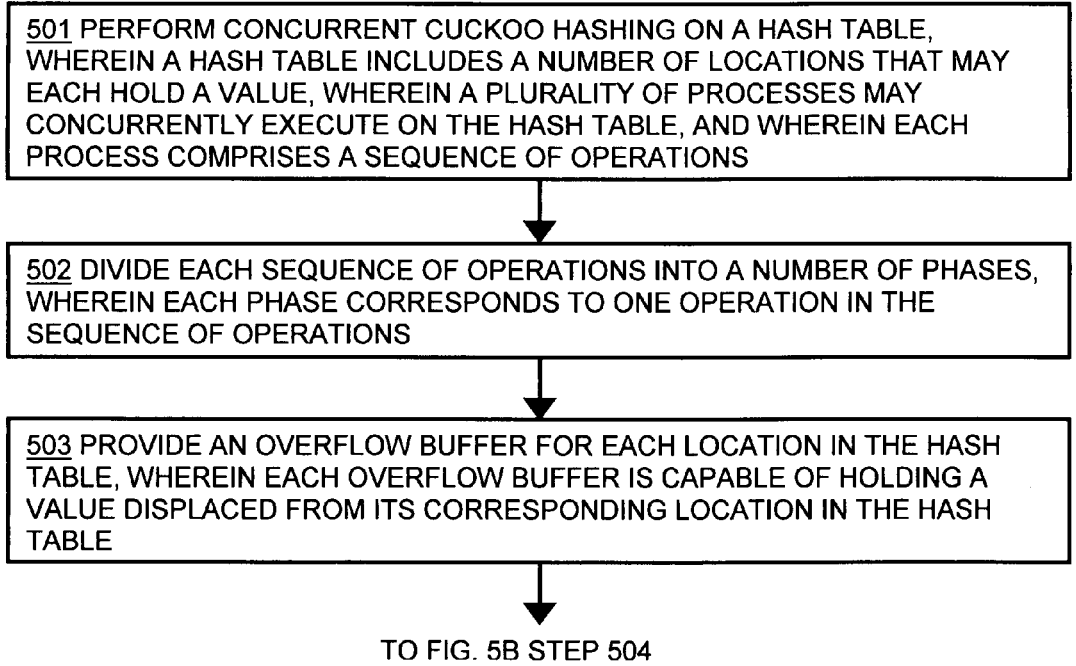
FIGS. 5A-5B illustrate a flowchart of a procedure performed by the system of FIG. 1 when the concurrent extensible cuckoo hashing application performs contain, add, and remove operations on the hash table.
Figure 5B:
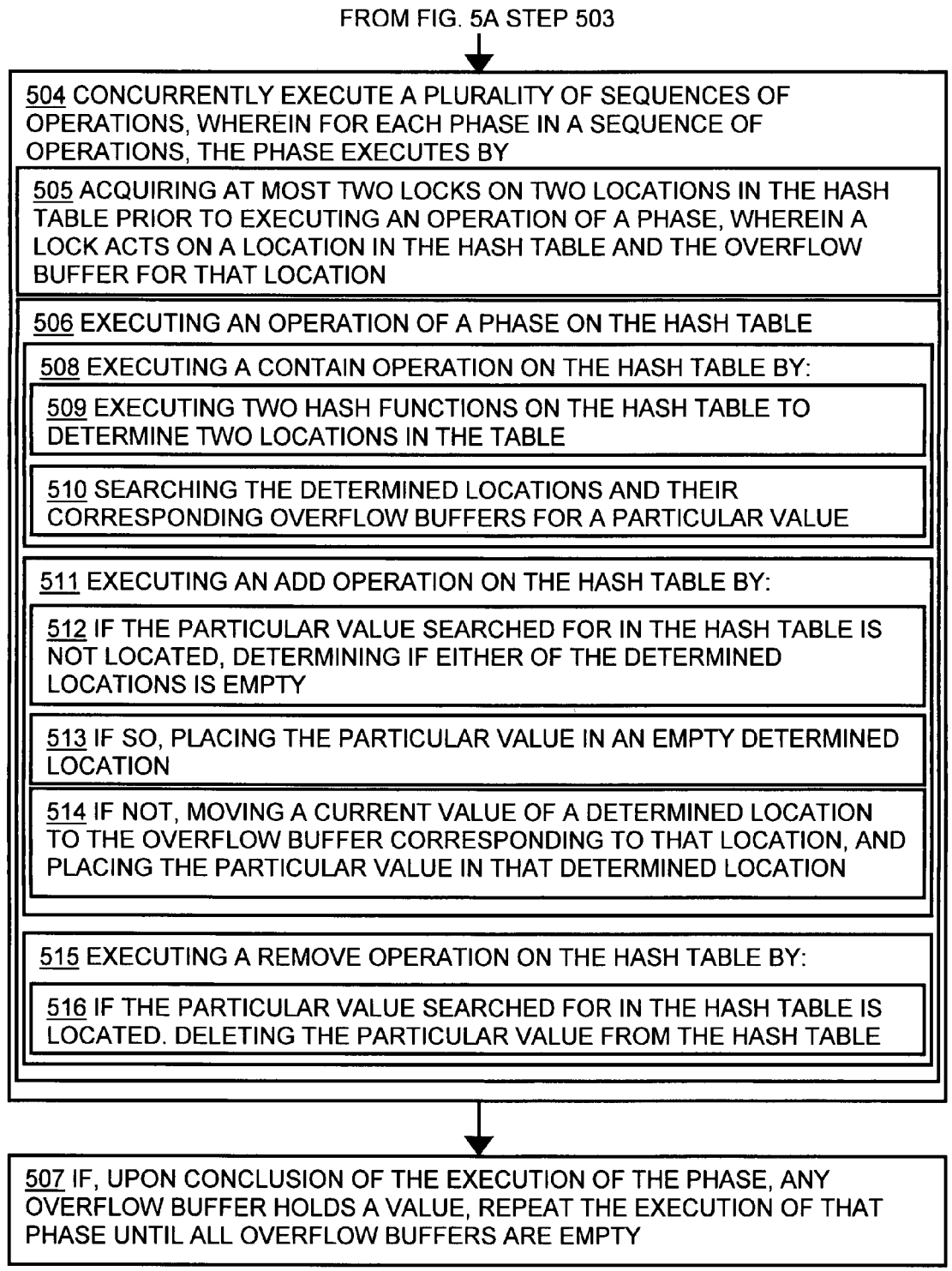

In FIG. 5, the particulars of the contain( ), remove( ), and add( ) operations are described. As described above, first the concurrent extensible cuckoo hashing process 140-2 divides each sequence of operations into a number of phases, step 502. Next, the concurrent extensible cuckoo hashing process 140-2 provides an overflow buffer for each location in the hash table, step 503. Each overflow buffer is capable of holding at least one value displaced from its corresponding location in the hash table. Next, the concurrent extensible cuckoo hashing process 140-2 concurrently executes a plurality of sequences of operations, step 504. This involves at least two separate steps for each phase in a sequence of operations. First, the concurrent extensible cuckoo hashing process 140-2 acquires at most two locks on two locations in the hash table prior to executing an operation of a phase, step 505.

When the concurrent extensible cuckoo hashing process 140-2 executes an operation of a phase on the hash table, step 506, and that operation is a contain operation, step 508, the concurrent extensible cuckoo hashing process 140-2 executes two hash functions on the hash table to determine two locations in the table, step 509. The concurrent extensible cuckoo hashing process 140-2 then searches the determined locations and their corresponding overflow buffers for a particular value, step 510. That particular value is the value identified in the call of the contain operation. For example, if as shown in FIG. 2, location 3 of the array 201 of the hash table 200 contains the value 23, and during operation, the concurrent extensible cuckoo hashing process 140-2 calls the contain( ) operation seeking the value 23, location 3 will ultimately be returned. As stated above, the contain operation will also search the overflow buffers corresponding to the determined locations. Thus, if the concurrent extensible cuckoo hashing process 140-2 calls the contain( ) operation seeking the value 20, the overflow buffer 204 corresponding to location 7 in the array 202 of the hash table 200 will ultimately be returned.

When the concurrent extensible cuckoo hashing process 140-2 executes an operation of a phase on the hash table, step 506, and that operation is the add operation, step 511, the concurrent extensible cuckoo hashing process 140-2 first executes the contain operation as described above, to determine if the value to be added is already in the table, in which case the concurrent extensible cuckoo hashing process 140-2 need not add it. If the particular value the concurrent extensible cuckoo hashing process 140-2 searched for in the hash table by executing the contain operation is not located, the concurrent extensible cuckoo hashing process 140-2 then determines if either of the determined locations is empty, step 512. If so, the concurrent extensible cuckoo hashing process 140-2 places the particular value in an empty determined location, step 513. If not, the concurrent extensible cuckoo hashing process 140-2 moves a current value of a determined location to the overflow buffer corresponding to that location, and places the particular value in that determined location, step 514. Example code for the add(x) method or operation may be found in FIG. 9.

More specifically, similar to the remove( ) operation described below, the add(x) method or operation calls acquire (x) to acquire the necessary locks, then enters a try block whose finally block calls release (x). The operation returns false if the item is already present (Line 46). The operation places the item in the table if either of its entries or locations are empty (Lines 49 and 52). If neither entry or location is empty, then the operation displaces an item y from table [0][$h_0$(x)] to overflow[0][$h_0$(x)] (Lines 56-58). At Line 62, the operation calls relocate (y), described below, to move displaced items or values back into the table. If the relocate (y) call returns false, indicating that the relocate operation failed to move enough overflowed items into the table, then add( ) may call the resize operation to resize the hash table, as is described in greater detail below.

For example, if the concurrent extensible cuckoo hashing process 140-2 calls the add( ) operation with a value of 30, first it is determined that 30 is not located in the hash table 200. If either of the determined locations for the value of 30 are empty, such as location 4 of the array 202 of the hash table 200, then the concurrent extensible cuckoo hashing process 140-2 places the value of 30 into that location, as is shown in FIG. 2. If neither location was empty, say the determined locations were location 3 of the array 201 and location 1 of the array 202, the concurrent extensible cuckoo hashing process 140-2 would instead displace the contents of one of those locations into the overflow buffer corresponding to that location, and would then place the value of 30 into the now empty location.

When the concurrent extensible cuckoo hashing process 140-2 executes an operation of a phase on the hash table, step 506, and that operation is the remove operation, step 515, the concurrent extensible cuckoo hashing process 140-2 will first execute the contain operation as described above. If the particular value searched for in the hash table is located, the concurrent extensible cuckoo hashing process 140-2 deletes the particular value from the hash table, step 516. If the particular value search for in the hash table is not located, then the concurrent extensible cuckoo hashing process 140-2 does nothing, as the concurrent extensible cuckoo hashing process 140-2 cannot remove a value from the hash table when that value is not present in the hash table.

Example code for the remove(x) method or operation is shown in FIG. 8. More specifically, the remove(x) method calls acquire(x) to acquire the necessary locks, then enters a try block whose finally block calls release (x). In the try block, the method simply checks whether x is present in table [0][$h_0$(x)], overflow[0][$h_0$(x)], table [1][$h_1$(x)], or overflow[1][$h_1$(x)]. If x is found, x is deleted or removed and the operation returns true; otherwise, the operation returns false. The contains(x) method or operation works in a similar way, as described above, and is called by the remove(x) method as seen in FIG. 8.

For example, if the concurrent extensible cuckoo hashing process 140-2 calls the remove( ) operation with a value of 24, the concurrent extensible cuckoo hashing process 140-2 first executes the contain( ) operation as described above to determine if any location and/or overflow buffer in the hash table 200 currently holds the value of 24. As shown in FIG. 2, location 2 of the array 202 of the hash table 200 holds the value of 24. The contain( ) operation would thus return this location, and the remove operation would act on that location to delete the value of 24 from the hash table 200, as is shown in FIG. 2.

If, upon conclusion of the execution of the phase, any overflow buffer holds a value, the concurrent extensible cuckoo hashing process 140-2 repeats the execution of that phase until all overflow buffers are empty, step 507.

FIG. 6 illustrates a method where the concurrent extensible cuckoo hashing process 140-2 may need to resize the hash table. Prior to a resizing operation occurring, the concurrent extensible cuckoo hashing process 140-2 divides each sequence of operations into a number of phases, step 602. The concurrent extensible cuckoo hashing process 140-2 then provides an overflow buffer for each location in the hash table, step 603, wherein each overflow buffer is capable of holding at least one value displaced from its corresponding location in the hash table. The concurrent extensible cuckoo hashing process 140-2 concurrently executes a plurality of sequences of operations, step 604. This involves at least two separate steps for each phase in a sequence of operations. First, the concurrent extensible cuckoo hashing process 140-2 acquires at most two locks on two locations in the hash table prior to executing an operation of a phase, step 605. With the locks acquired, the concurrent extensible cuckoo hashing process 140-2 executes an operation of a phase on the hash table, step 606. If, upon conclusion of the execution of the phase, any overflow buffer holds a value, the concurrent extensible cuckoo hashing process 140-2 repeats the execution of that phase until all overflow buffers are empty, step 607.

While performing any of the steps described above with regards to FIGS. 3-5, the concurrent extensible cuckoo hashing process 140-2 may detect that the amount of data stored in overflow buffers exceeds a threshold, step 608. If so, in response, the concurrent extensible cuckoo hashing process 140-2 may execute a resizing operation on the hash table, step 609. An example of code for performing such a resizing operation may be found in FIG. 13. The resize ( ) methods of StripedCuckooHashSet<T> acquires the locks in lock[0] in ascending order (Line 25). Acquiring these locks in this order ensures that no other thread is in the middle of an add( ), remove( ) or contains( ) call, and avoids deadlocks with other concurrent resize( ) calls.

By performing a resizing operation on the hash table, the concurrent extensible cuckoo hashing process 140-2 may need to change the location of the hash table in the memory system 112 (shown in FIG. 1). Prior to resizing, the hash table may be located in a specific area of memory. Thus, when the concurrent extensible cuckoo hashing process 140-2 executes a resizing operation on the hash table, step 610, the concurrent extensible cuckoo hashing process 140-2 may inform any processes waiting for access to the hash table (i) that the location of the hash table has changed due to the resizing operation and (ii) of the changed location, step 611.

More particularly, resizing is a rare operation, so a way to permit the lock array to be resized without substantially increasing the cost of normal method calls is worthwhile. To refine the granularity of locking as the table size grows, so that the number of locations in a stripe does not continuously grow, and to add a higher level of synchronization, an owner field is used. The owner field combines a Boolean value with a reference to a thread. Normally, the Boolean value is false, meaning that the set is not in the middle of resizing. While a resizing is in progress, however, the Boolean value is true, and the associated reference indicates the thread that is in charge of resizing. These two values are combined in a AtomicMarkableReference<Thread> to allow them to be modified atomically.

If the Boolean value is true, the set is resizing, and the reference indicates the thread that is in charge of resizing.

Each phase locks the buckets for x by calling acquire(x), example code of which is shown in FIG. 14A-14B. The acquire operation reads the lock array (Line 24), and then spins until no other thread is resizing the set (Lines 21 through 23). The acquire operation then acquires the item's two locks (Lines 27 and 27), and checks if the lock array is unchanged (Line 30). If the lock array has not changed between Lines 24 and 30, then the thread has acquired the locks it needs to proceed. Otherwise, the locks the thread has acquired are out of date, so it releases them and starts over. The release (x) method releases the locks acquired by acquire(x).

The resize ( ) method or operation is almost identical to the resize ( ) method for the StripedCuckooHashSet<T> class. One difference is that the lock[ ] array has two dimensions.

The quiesce( ) method or operation visits each lock and waits until it is unlocked. The only difference is that it visits only the locks in lock[0].

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of performing concurrent cuckoo hashing on a hash table, wherein a hash table includes a number of locations that may each hold a value, wherein a plurality of processes may concurrently execute on the hash table, and wherein each process comprises a sequence of operations, the method comprising:
dividing each sequence of operations into a number of phases, wherein each phase corresponds to one operation in the sequence of operations;
providing an overflow buffer for each location in the hash table, wherein each overflow buffer is for holding a value displaced from its corresponding location in the hash table;
concurrently executing a plurality of sequences of operations, wherein for each phase in a sequence of operations, the phase executes by:
acquiring, using a processor, at most two locks on two locations in the hash table prior to executing an operation of a phase, wherein a lock acts on a location in the hash table and the overflow buffer for that location; and
executing, using a processor, an operation of a phase on the hash table; and
if, upon conclusion of the execution phases, any overflow buffer holds a value, repeating the execution of that phase until all overflow buffers are empty, wherein repeating execution comprises relocating an overflow buffer value to a hash table location.

2. The method of claim 1 wherein an overflow buffer is for holding multiple values displaced from the hash table.

3. The method of claim 1 wherein executing an operation of a phase comprises:
executing two hash functions on the hash table to determine two locations in the table; and
searching the determined locations and their corresponding overflow buffers for a particular value.

4. The method of claim 3 wherein executing an operation of a phase further comprises:
executing an add operation on the hash table by:
if the particular value searched for in the hash table is not located, determining if either of the determined locations is empty;
if either of the determined locations is empty, placing the particular value in an empty determined location;
if neither of the determined locations is empty, moving a current value of a determined location to the overflow buffer corresponding to that location, and placing the particular value in that determined location.

5. The method of claim 3 wherein executing an operation of a phase further comprises:
executing a remove operation on the hash table by:
if the particular value searched for in the hash table is located, deleting the particular value from the hash table.

6. The method of claim 1 comprising:
detecting that the amount of data stored in overflow buffers exceeds a threshold; and
in response, executing a resizing operation on the hash table.

7. The method of claim 6 wherein the hash table is located in a specific area of memory, and wherein executing a resizing operation comprises:
informing any processes waiting for access to the hash table (i) that the location of the hash table has changed due to the resizing operation and (ii) of the changed location.

8. A computer system comprising:
a memory;
a processor in communication with the memory;
wherein the memory is encoded with a concurrent cuckoo hashing application, that when executed in the processor, provides a concurrent cuckoo hashing process that performs concurrent cuckoo hashing on a hash table, wherein a hash table includes a number of locations that may each hold a value, wherein a plurality of processes may concurrently execute on the hash table, and wherein each process comprises a sequence of operations, by causing the computer system to perform the steps of:
dividing each sequence of operations into a number of phases, wherein each phase corresponds to one operation in the sequence of operations;
providing an overflow buffer for each location in the hash table, wherein each overflow buffer is for holding a value displaced from its corresponding location in the hash table;
concurrently executing a plurality of sequences of operations, wherein for each phase in a sequence of operations, the phase executes by:
acquiring, using a processor, at most two locks on two locations in the hash table prior to executing an operation of a phase, wherein a lock acts on a location in the hash table and the overflow buffer for that location; and
executing, using the processor, an operation of a phase on the hash table; and
if, upon conclusion of the execution of the phases, any overflow buffer holds a value, repeating the execution of that phase until all overflow buffers are empty, wherein repeating execution comprises relocating an overflow buffer value to a hash table location.

9. The computer system of claim 8 wherein an overflow buffer is for holding multiple values displaced from the hash table.

10. The computer system of claim 8 wherein executing an operation of a phase comprises:
executing two hash functions on the hash table to determine two locations in the table; and
searching the determined locations and their corresponding overflow buffers for a particular value.

11. The computer system of claim 10 wherein executing an operation of a phase further comprises:
executing an add operation on the hash table by:
if the particular value searched for in the hash table is not located, determining if either of the determined locations is empty;
if either of the determined locations is empty, placing the particular value in an empty determined location;
if neither of the determined locations is empty, moving a current value of a determined location to the overflow buffer corresponding to that location, and placing the particular value in that determined location.

12. The computer system of claim 10 wherein executing an operation of a phase further comprises:
executing a remove operation on the hash table by:
if the particular value searched for in the hash table is located, deleting the particular value from the hash table.

13. The computer system of claim 8 comprising:
detecting that the amount of data stored in overflow buffers exceeds a threshold; and
in response, executing a resizing operation on the hash table.

14. A product to perform concurrent cuckoo hashing on a table, wherein a hash table includes a number locations that may each hold a value, wherein a plurality of processes may concurrently execute on the hash table, and wherein each process comprises a sequence of operations, the product comprising a storage medium having computer executable instructions recorded thereon for:

dividing each sequence of operations into a number of phases, wherein each phase corresponds to one operation in the sequence of operations;

providing an overflow buffer for each location in the hash table, wherein each overflow buffer is for holding a value displaced from its corresponding location in the hash table;

concurrently executing a plurality of sequences of operations, wherein for each phase in a sequence of operations, the phase executes by:

acquiring at most two locks on two locations in the hash table prior to executing an operation of a phase, wherein a lock acts on a location in the hash table and the overflow buffer for that location; and executing an operation of a phase on the hash table; and if, upon conclusion of the execution of the phases, any overflow buffer holds a value, repeating the execution of that phase until all overflow buffers are empty, wherein repeating execution comprises relocating an overflow buffer value to a hash table location.

15. The product of claim 14 wherein an overflow buffer is for holding multiple values displaced from the hash table.

16. The of claim 14 wherein executing an operation of a phase comprises computer executable instructions for:

executing two hash functions on the hash table to determine two locations in the table; and searching the determined locations and their corresponding overflow buffers for a particular value.

17. The product of claim 16 wherein executing an operation of a phase further comprises computer executable instructions for:

executing an add operation on the hash table by:

if the particular value searched for in the hash table is not located, determining if either of the determined locations is empty;

if either of the determined locations is empty, placing the particular value in an empty determined location;

if neither of the determined locations is empty, moving a current value of a determined location to the overflow buffer corresponding to that location, and placing the particular value in that determined location.

18. The product of claim 16 wherein executing an operation of a phase further comprises computer executable instructions for:

executing a remove operation on the hash table by:

if the particular value searched for in the hash table is located, deleting the particular value from the hash table.

19. The product of claim 14 further comprising computer executable instructions for:

detecting that the amount of data stored in overflow buffers exceeds a threshold; and in response, executing a resizing operation on the hash table.

20. The product of claim 19 wherein the hash table is located in a specific area of memory, and wherein executing a resizing operation comprises computer executable instructions for:

informing any processes waiting for access to the hash table (i) that the location of the hash table has changed due to the resizing operation and (ii) of the changed location.

* * * * *

UNITED STATES PATENT AND TRADEMARK OFFICE
CERTIFICATE OF CORRECTION

PATENT NO. : 7,657,500 B2 Page 1 of 1
APPLICATION NO. : 11/717453
DATED : February 2, 2010
INVENTOR(S) : Nir N. Shavit et al.

It is certified that error appears in the above-identified patent and that said Letters Patent is hereby corrected as shown below:

Column 16, Line 23, Claim 8:

Delete "a processor" and insert -- the processor --.

Column 17, Line 30, Claim 16:

After "The" and before "of claim 14" insert -- product --.

Signed and Sealed this

Sixth Day of April, 2010

David J. Kappos
*Director of the United States Patent and Trademark Office*